United States Patent [19]

Yamaguchi

[11] Patent Number: 5,101,132
[45] Date of Patent: Mar. 31, 1992

[54] LINEAR ULTRASONIC MOTOR
[75] Inventor: Masaki Yamaguchi, Gifu, Japan
[73] Assignee: Brother Kogyo Kabushiki Kaisha, Nagoya, Japan
[21] Appl. No.: 574,765
[22] Filed: Aug. 30, 1990
[51] Int. Cl.$^5$ .......................................... H01L 41/08
[52] U.S. Cl. ..................................... 310/323; 310/321; 310/328
[58] Field of Search ........................ 310/321, 328

[56] References Cited

U.S. PATENT DOCUMENTS

| | | | |
|---|---|---|---|
| 3,154,700 | 1/1961 | McNankey | 310/328 |
| 3,171,696 | 3/1965 | Haughton | 310/328 |
| 3,246,608 | 4/1966 | Cooper | 310/328 |
| 4,163,168 | 7/1979 | Ighikawa | 310/328 |
| 4,607,166 | 8/1986 | Tamaki | 310/328 |
| 4,613,782 | 9/1986 | Mori et al. | 310/323 |
| 4,672,256 | 6/1987 | Okuno et al. | 310/323 |
| 4,692,652 | 9/1987 | Seki et al. | 310/323 |
| 4,708,600 | 11/1987 | Abujudan | 310/328 |
| 4,742,260 | 5/1988 | Shinizu et al. | 310/328 |
| 4,743,788 | 5/1988 | Takagi et al. | 310/323 |
| 4,894,579 | 1/1990 | Higuchi | 310/328 |
| 4,912,351 | 3/1990 | Takata et al. | 310/323 |
| 4,928,030 | 5/1990 | Culp | 310/328 |
| 4,939,404 | 7/1990 | Inagaki et al. | 310/323 |
| 4,947,077 | 8/1990 | Murata | 310/323 |
| 4,950,135 | 8/1990 | Tojo et al. | 310/323 |

FOREIGN PATENT DOCUMENTS

| | | | |
|---|---|---|---|
| 231461A | 12/1985 | Fed. Rep. of Germany . | |
| 0234476 | 11/1985 | Japan | 310/328 |
| 61-185081 | 8/1986 | Japan . | |
| 0048252 | 3/1987 | Japan | 310/323 |
| 63-39474 | 2/1988 | Japan . | |
| 0133877 | 6/1988 | Japan | 310/325 |
| 0244205 | 10/1988 | Japan | 310/328 |
| 63-277477 | 11/1988 | Japan . | |
| 1-126178 | 5/1989 | Japan . | |
| 1-198284 | 8/1989 | Japan . | |
| 2-26282 | 1/1990 | Japan . | |
| 0548912 | 3/1977 | U.S.S.R. | 310/328 |
| 0777727 | 11/1980 | U.S.S.R. | 310/328 |

OTHER PUBLICATIONS

"Ultrasonic Motors Using Electric Ceramic Multi-Mode Vibrators", by T. Takamo et al., Dept. of Comm. Engr., T. Institute, 12-21-87.

Primary Examiner—Mark O. Budd
Assistant Examiner—Thomas M. Dougherty
Attorney, Agent, or Firm—Oliff & Berridge

[57] ABSTRACT

A linear ultrasonic motor which presses a rail against an ultrasonic vibrator, which is substantially elliptically vibrating and conducts relative movement, wherein a protrusion or a groove is provided such that the sectional form of the rail is concave, convex, trapezoidal or triangular. Furthermore, the above vibrator is provided with a groove or a protrusion which uniformly abuts the groove or protrusion of the rail. In the linear ultrasonic motor according to the invention, there is no deterioration of responsiveness due to a support mechanism and no unnecessary vibration, so generated noise is small.

19 Claims, 3 Drawing Sheets

LINEAR ULTRASONIC MOTOR

BACKGROUND OF THE INVENTION

The present invention relates to an improvement of a linear ultrasonic motor generating longitudinal and transverse motion.

Ultrasonic motors are broadly classified into travelling-wave types and standing-wave types.

The principle of operation of the standing-wave type ultrasonic motor is to abut a moving member with specified pressure, against an ultrasonic vibrator exciting substantially an elliptical movement to drive a moving member by a frictional force between mass points on the ultrasonic vibrator, which are elliptically vibrating and the moving member.

The standing-wave type ultrasonic vibrator is easy to construct such that it realizes highly efficient vibration. Accordingly, the standing-wave type motor is advantageous for obtaining high efficiency and large output compared with the travelling-wave type motor.

The ultrasonic vibrator used for a conventional standing-wave type motor employs a mechanical resonance type vibration of normal mode which makes a single-directional vibration on the contact surface of an elastomer with an exciter while making an elliptical vibration on the contact surface of an elastomer with a moving member in order to excite a highly efficient elliptical movement.

The conventional ultrasonic motor is classified into a rectilinear and a curvilinear type. An example is shown in FIG. 6.

A linear ultrasonic motor 31 is constructed such that a drive unit 32 provided in an ultrasonic vibrator 11 is pressed against a rail 34 by a support member 33. Roller bearings 35 are fixed to the both ends of the support member 33. Support bases 61 are fixed to the both ends of the rail 34. The support bases are provided on a base 62. An ultrasonic wave transmitter-receiver 63 is fixed to a part of the rail 34 for transmitting and receiving ultrasonic vibration.

In this linear ultrasonic motor, there is a problem of side-slip or running of a moving member, necessitating some support mechanism. A support mechanism supports the sides of the rail therebetween via rollers, thereby largely increasing the weight of the moving member and deteriorating the responsiveness. Moreover, the structure becomes complicated and unnecessary vibration occurs.

SUMMARY OF THE INVENTION

The present invention has been made to prevent the moving member from side-slipping or running by means of a protrusion or a groove for guiding provided on the rail. The object is to obtain a linear ultrasonic motor without deteriorating the responsiveness nor causing unnecessary vibration.

In order to accomplish the above object, the linear ultrasonic motor of the present invention presses the rail against the ultrasonic vibrator exciting elliptical vibration with specified force and conducts relative motion, wherein a protrusion or a groove is constructed such that the sectional form of the rail is concave, convex, trapezoidal or triangular.

Furthermore, the above vibrator is provided with a groove or a protrusion which uniformly abuts the groove or protrusion of the rail.

BRIEF DESCRIPTION OF THE DRAWINGS

FIGS. 1 through 5 show an embodiment of the invention, wherein:

FIG. 1 is an upper surface view of an ultrasonic vibrator used in this embodiment;

FIG. 2 is a side view of the above vibrator;

DETAILED EXPLANATION OF PREFERRED EMBODIMENTS

An embodiment of this invention is now explained referring to accompanying drawings.

An ultrasonic motor, for example, proposed in Japanese Patent Application NO. 1-46866 is employed in the following explanation.

Figure 1:
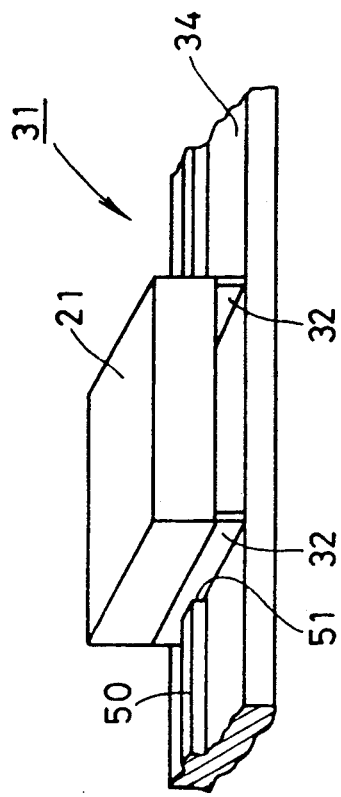
Figure 2:
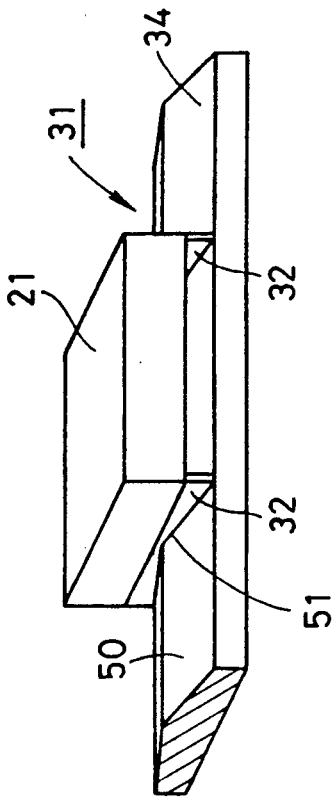

First, an ultrasonic vibrator of the ultrasonic motor is explained. As shown in FIGS. 1 and 2, in the ultrasonic vibrator 11, a first piezoelectric body 22 is provided on the upper surface of an elastomer 21 with a shape of rectangular plate for exciting flexural vibration on the elastomer 21. On the side surfaces of the elastomer 21 intersecting the first piezoelectric body 21, second piezoelectric bodies 23a and 23b are provided for exciting longitudinal vibration on the elastomer 21.

The center of the elastomer 21 in a longitudinal direction is secured by fixing bolts 24a and 24b for securing the elastomer 21. On the upper surface of the first piezoelectric body 22, electrodes 27a and 27b are attached. The elastomer 21 itself is a grounding electrode and is grounded to a base 25a and 25b via above described fixing bolts 24a and 24b.

Furthermore, the shape and dimensions of the elastomer 21 are adjusted such that the elastomer 21 vibrates in its thickness direction with the specified frequency f and in the secondary mode of free ends at both ends and longitudinally vibrates in its longitudinal direction with the same frequency f and in the primary mode of free ends at both ends.

Generally, the number of resonance frequency of the longitudinal vibration propagating in the elastomer depends on the length of the elastomer. The number of resonance frequency of the flexural vibration in the thickness direction depends on the length and thickness of the elastomer. Accordingly, designing of such elastomer 21 is simple and the details of such design are omitted here.

The operation of the ultrasonic vibrator 11 constructed as above is now explained.

First, the first piezoelectric body 22 is caused to vibrate by an alternating voltage of the specified frequency f. The elastomer 21 resonates in the secondary mode of the flexural vibration, thus exciting the standing wave.

Next, the second piezoelectric bodies 23a and 23b are caused to vibrate by an alternating voltage of specified frequency f. The elastomer 21 vibrates in a longitudinal vibration of the primary mode, exciting a standing wave. In other words, the positions fixed by the fixing bolts 24a and 24b are the nodes of each standing wave.

Desired shapes of elliptical vibration are obtained by adjusting the amplitude and phase of the voltage applied on the first piezoelectric body 22 and the second piezoelectric bodies 23a and 23b.

Figure 3B:
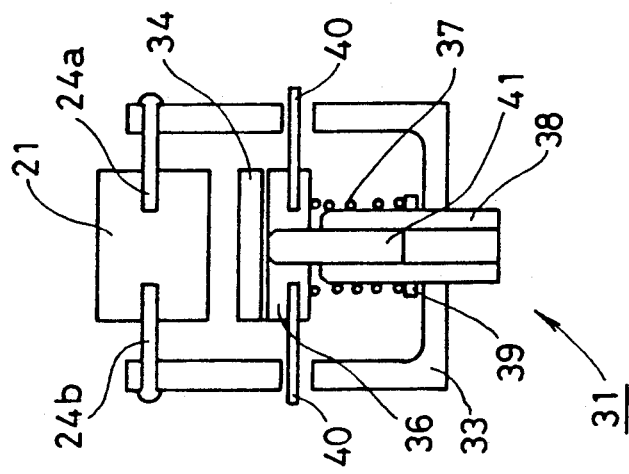
Figure 3A:
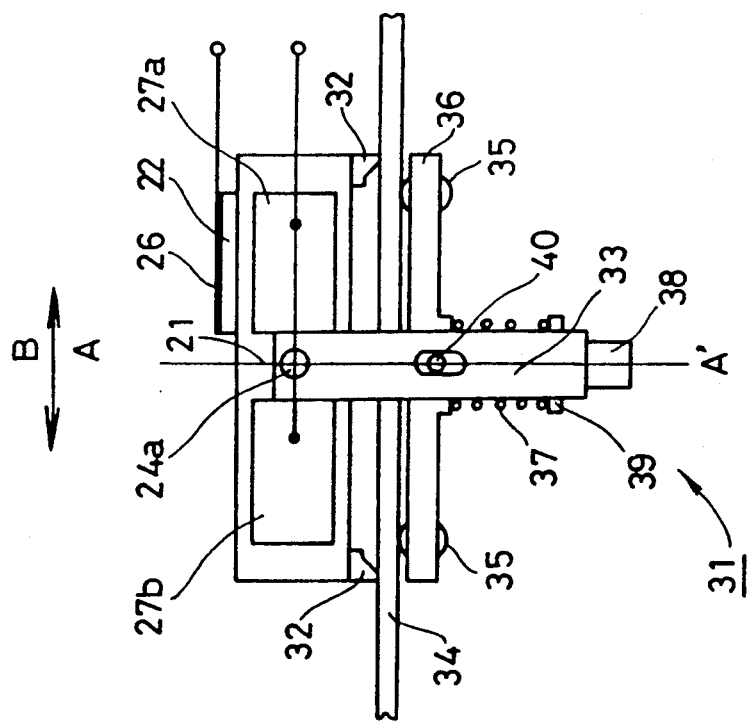
FIG. 3A is a side view of a linear ultrasonic motor to which this embodiment is applied.
Figure 6:
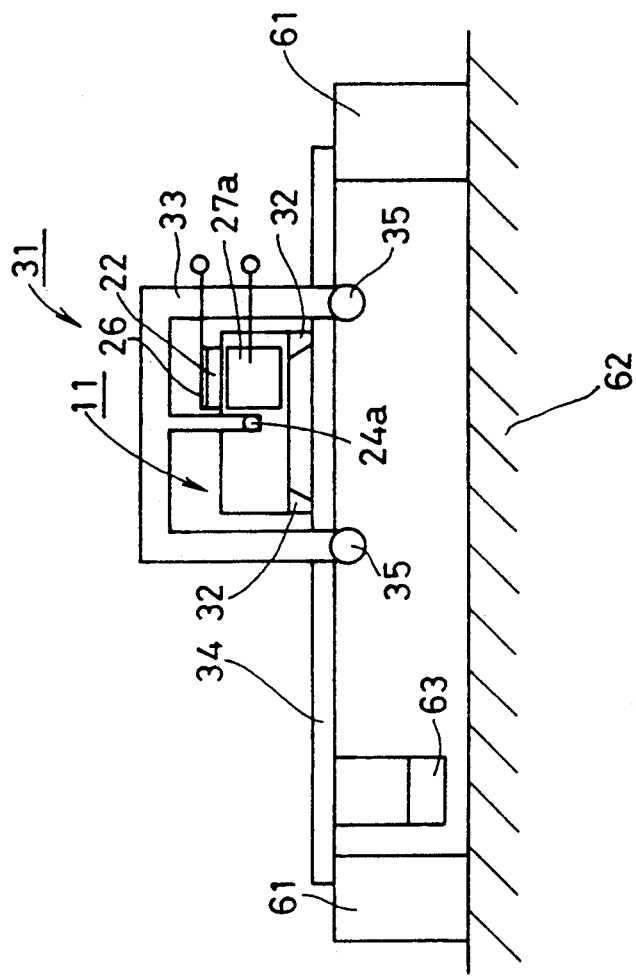
FIG. 6 is a side view of a conventional linear ultrasonic motor.
Figure 5A:
FIGS. 5A through F are perspective views showing partial sections of the rail.
Figure 5B:
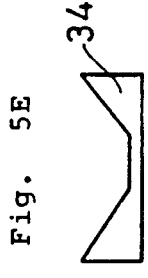
Figure 5C:
Figure 5D:
Figure 5E:
Figure 5F:

The constitution of the linear ultrasonic motor using the above ultrasonic vibrator 11 is now explained with reference to FIG. 3. FIG. 3A is a side view of a linear ultrasonic motor. FIG. 3B is a sectional view taken along A—A'. The members with the like reference numerals with FIGS. 1 and 2 are the same with the above-described constituents.

Drive units 32 are provided at the both ends of the ultrasonic vibrator 11, because the ends provide the largest amplitude of longitudinal vibration, and are pressed against the rail 34 supported via the fixing bolts 24a and 24b by the support member 33.

The mechanism to give pressure comprises a guide 36 disposed between the rail 34 and the support member 33 and supported by roller bearings 35, a coil spring 37, a spring guide 38, and a spring presser 39. The spring presser 39 adjusts pressure by rotating along the screwed groove formed on the spring guide 38 to vary the length of the coil spring 37.

Moreover, a first support member 40 is provided on the guide 36 for prevention of yawing and a second support member 41 is provided at substantially the center of the first guide 36 for prevention of rolling.

When the linear ultrasonic motor 31 constructed as above is applied with alternating electric signal with the designated frequency f, substantially an elliptical vibration occurs at the driving unit 32. The motor moves in a direction shown by an arrow mark B, being driven by the frictional force with the rail 34.

Figure 4A:
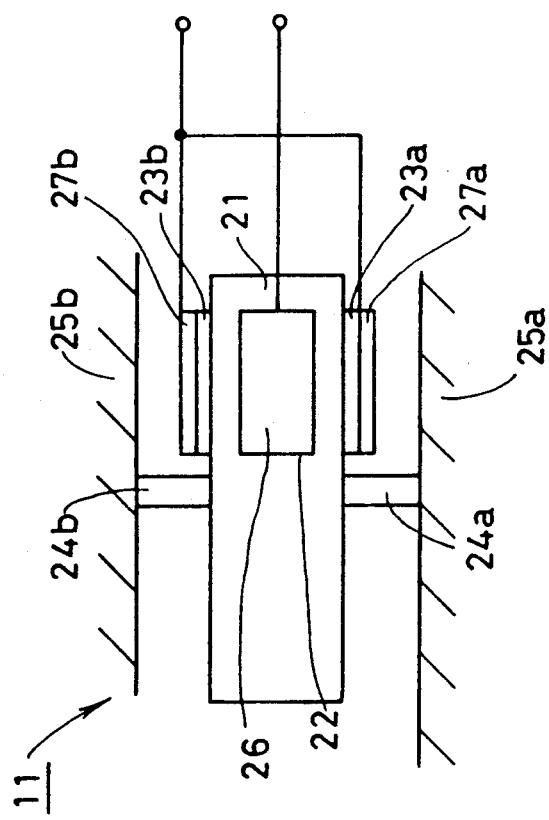
FIGS. 4A and 4B are perspective view showing an ultrasonic vibrator and a rail of the linear ultrasonic motor.
Figure 4B:
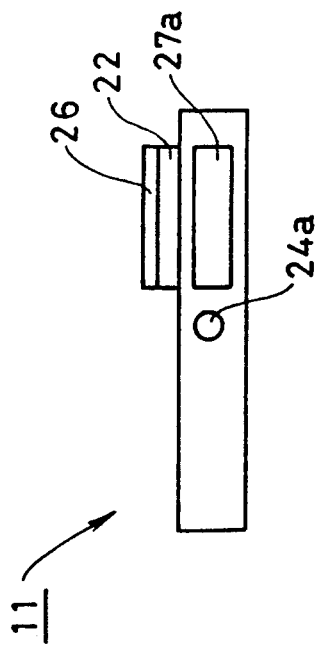

An example is shown in FIG. 4A, where a convex protrusion 50 is formed in the rail 34 while a concave groove 51 is formed in the driving unit 32 abutting the rail 34 such that uniform pressure is inflicted on the abutting surface of the driving unit 32. The pressing mechanism hitherto described in detail is omitted in this figure.

Since the protrusion 50 and the groove 51 are provided for guiding, the ultrasonic motor 31 is able to prevent the moving member from side-slipping or side-running without provision of the first support member 40 and the second support member 41. Subsequently, the linear ultrasonic motor being superior in responsiveness and lower in unnecessary vibration can be obtained, and thus noise is greatly reduced. Such linear ultrasonic motors are used widely for office automation equipment and drive sources of X-Y tables for machine tools.

Furthermore, various shapes of the rail such as substantially trapezoid, triangle and others are considered as shown in FIGS. 5a through f. These figures show partial sectional views of the rail.

The above-described embodiment uses piezoelectric bodies as driving elements of the vibrators. However, it is not limited to them but also other elements which convert electric energy to mechanical energy such as electrostrictive or magnetostrictive elements may be used. Moreover, the embodiment uses a plate-like shaped ultrasonic vibrator, however, if producing a substantially an elliptical movement, the shape is not limited to the shape of a plate, but a disc, cylinder, annular ring, bar, square, and other various shapes may be used. Besides, other various modifications can be made without departing from the scope of the invention.

What is claimed is:

1. A linear ultrasonic motor for providing movement relative to a rail, comprising:
   an elastic member;
   first vibrating means attached to the elastic member for causing vibration of the elastic member in a heightwise direction;
   second vibrating means attached to the elastic member for causing vibration of the elastic member in a longitudinal direction;
   first side movement prevention means provided at the rail; and
   second side movement prevention means provided at the elastic member such that the second side movement prevention means receives the first side movement prevention means; wherein
   first abutting surfaces on the first side movement prevention means oppose second abutting surfaces on the second side movement prevention means to prevent movement in a side direction orthogonal to a movement direction of the elastic member relative to the rail and orthogonal to the heightwise direction,
   the first side movement prevention means being a projection provided at the rail along the movement direction; and
   the second side movement prevention means being a pair of drive units provided at longitudinal ends of the elastic member, each of the drive units having a groove for receiving the projection.

2. The linear ultrasonic motor of claim 1, in which the movement direction of the elastic member is in the longitudinal direction.

3. The linear ultrasonic motor of claim 1, in which a cross-sectional area of the projection and a cross-sectional area of each groove are the same.

4. The linear ultrasonic motor of claim 3, in which the cross-sectional areas of the projection and each groove are one of rectangular, trapezoidal, and triangular.

5. A linear ultrasonic motor for providing movement relative to a rail, comprising:
   an elastic member having drive units provided at two ends thereof;
   first vibrating means attached to the elastic member for causing vibration of the elastic member in a heightwise direction;
   second vibrating means attached to the elastic member for causing vibration of the elastic member in a longitudinal direction, where the combination of the vibrations of the elastic member in the heightwise and longitudinal directions causes the drive units to vibrate elliptically;
   pressing means for pressing the elastic member towards the rail such that the drive units contact the rail;
   a support member for holding the elastic member and the pressing means;
   first side movement prevention means provided at the rail; and
   second side movement prevention means provided at the drive units such that the second side movement prevention means receives the first side movement prevention means; wherein
   first abutting surfaces on the first side movement prevention means oppose second abutting surfaces on the second side movement prevention means to prevent movement in a side direction orthogonal to a movement direction of the elastic member relative to the rail, where the movement direction is the same as the longitudinal direction and the side direction is orthogonal to the heightwise direction.

6. The linear ultrasonic motor of claim 5, in which:
the first side movement prevention means is a projection provided at the rail in the movement direction; and
the second side movement prevention means is a groove provided at the drive units for receiving the projection.

7. The linear ultrasonic motor of claim 6, in which a cross-sectional area of the projection and a cross-sectional area of the groove are the same.

8. The linear ultrasonic motor of claim 7, in which the cross-sectional areas of the projection and the groove are one of rectangular, trapezoidal, and triangular.

9. The linear ultrasonic motor of claim 5, in which:
the first side movement prevention means is a groove provided at the rail in the movement direction; and
the second side movement prevention means is a projection provided at the drive units such that the groove receives the projection in contacting relationship.

10. The linear ultrasonic motor of claim 9, in which a cross-sectional area of the projection and a cross-sectional area of the groove are the same.

11. The linear ultrasonic motor of claim 10, in which the cross-sectional areas of the projection and groove are one of rectangular, trapezoidal, and triangular.

12. A linear ultrasonic motor for providing movement relative to a rail, comprising:
an elastic member having drive units provided at two ends thereof;
first vibrating means attached to the elastic member for causing vibration of the elastic member in a heightwise direction;
second vibrating means attached to the elastic member for causing vibration of the elastic member in a longitudinal direction, where the combination of the vibrations of the elastic member in the heightwise and longitudinal directions causes the drive units to vibrate elliptically;
pressing means for pressing the elastic member towards the rail such that the drive units contact the rail;
a support member for holding the elastic member and the pressing means;
a projection provided at the rail; and
a groove provided at the drive units such that the groove receives the projection; wherein
two surfaces on the projection oppose two surfaces on the groove to prevent movement in a side direction orthogonal to a movement direction of the elastic member relative to the rail, where the movement direction is the same as the longitudinal direction and the side direction is orthogonal to the heightwise direction.

13. The linear ultrasonic motor of claim 12, in which a cross-sectional area of the projection and a cross-sectional area of the groove are the same.

14. The linear ultrasonic motor of claim 13, in which the cross-sectional areas of the projections and the groove are one of rectangular, trapezoidal, and triangular.

15. The linear ultrasonic motor of claim 14, in which the pressing means comprises:
a guide having rollers formed thereon, where the rollers contact a side of the rail opposite to the elastic member; and
a spring member in contact with the guide for forcing the support member to press the elastic member towards the rail such that the drive units contact the rail.

16. A linear ultrasonic motor providing movement relative to a rail, comprising:
an elastic member;
first vibrating means attached to the elastic member for causing vibration of the elastic member in a heightwise direction;
second vibrating means attached to the elastic member for causing vibration of the elastic member in a longitudinal direction;
first side movement prevention means provided at the rail; and
second side movement prevention means provided at the elastic member such that the second side movement prevention means receives the first side movement prevention means; wherein
first abutting surfaces on the first side movement prevention means oppose second abutting surfaces on the second side movement prevention means to prevent movement in a side direction orthogonal to a movement direction of the elastic member relative to the rail and orthogonal to the heightwise direction,
the first side movement prevention means being a groove provided at the rail in the movement direction; and
the second side movement prevention means being a pair of drive units provided at longitudinal ends of the elastic member, each of the drive units having a projection such that the groove receives the projection.

17. The linear ultrasonic motor of claim 16, in which the movement direction of the elastic member is in the longitudinal direction.

18. The linear ultrasonic motor of claim 16, in which a cross-sectional area of the projection and a cross-sectional area of each groove are the same.

19. The linear ultrasonic motor of claim 18, in which the cross-sectional areas of each projection and groove are one of rectangular, trapezoidal, and triangular.

* * * * *